(No Model.)
A. H. EYSAMAN.
WHIFFLETREE HOOK.
No. 403,930. Patented May 28, 1889.
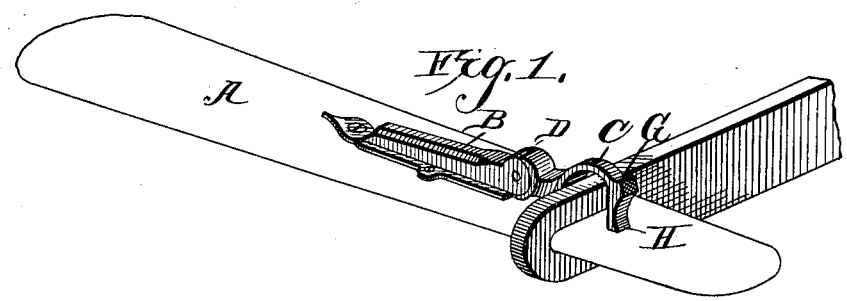
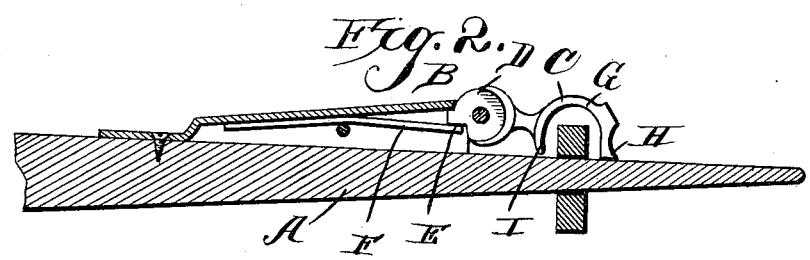
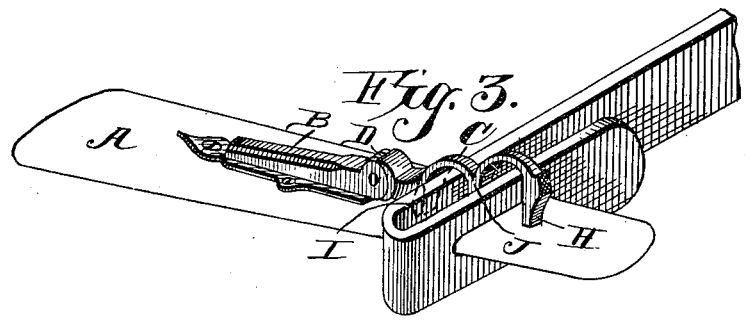
Witnesses.
Henry G. Dieterich
R. W. Bishop.
Inventor,
Adam H. Eysaman
By his Attorneys

UNITED STATES PATENT OFFICE.

ADAM H. EYSAMAN, OF MOHAWK, NEW YORK.

WHIFFLETREE-HOOK.

SPECIFICATION forming part of Letters Patent No. 403,930, dated May 28, 1889.

Application filed January 15, 1889. Serial No. 296,404. (No model.)

*To all whom it may concern:*

Be it known that I, ADAM H. EYSAMAN, a citizen of the United States, residing at Mohawk, in the county of Herkimer and State of New York, have invented new and useful Improvements in Whiffletree-Hooks, of which the following is a specification.

My invention relates to improvements in whiffletree-hooks; and it consists in certain novel features hereinafter described and claimed.

In the accompanying drawings, Figure 1 is a perspective view of a whiffletree provided with my improved hook. Fig. 2 is a longitudinal section of the same. Fig. 3 is a view of a modified form of hook.

Referring to the drawings by letter, A designates the whiffletree, and B a casting secured longitudinally on the upper side of the same. The said casting is enlarged at its outer end, and the hook C is pivoted in said enlarged end. The said hook comprises a circular portion, D, through which the pivot-pin is passed, and having a notch, E, in its edge, which is engaged by the end of a spring, F, secured within the casting, as shown. From this circular portion the hook proper, G, projects toward the end of the whiffletree, and the said hook is provided with the flat end H, which is adapted to rest upon the upper side of the whiffletree and prevent the trace being slipped from the end of the same, and the lip I depending from the hook and adapted to bear against the inner side of the trace to prevent its slipping inward.

From the foregoing description it will be seen that I have provided an extremely simple whiffletree-hook, by the use of which the trace will be effectively prevented from slipping upon the whiffletree, and which can be easily operated to release the trace when so desired. The lip I, besides preventing the trace slipping inward, also prevents dirt being worked under the pivoted portion of the hook and into the casing by the trace.

When it is desired to release the trace from the whiffletree, the hook is raised against the tension of the spring and the trace then slipped off the whiffletree. When the trace has been applied to the whiffletree, the hook is moved off the dead-center, and the spring will then throw it downward over the trace and will hold it in position to secure the trace against premature or accidental disengagement from the whiffletree.

In Fig. 3 I have shown the hook as provided with a depending tongue, J, between the lip I and the flattened end H. This form is especially advantageous when the trace is long and has to be doubled. The trace is slipped over the whiffletree at the proper point and the extra length then doubled on itself, so as to extend forward and slip over the whiffletree. The hook is then brought down over the trace, one branch of the trace passing between the lip I and tongue J and the other branch passing between the tongue J and the end H of the hook. The trace will thus be securely held on the whiffletree, so that it cannot slip therefrom.

Having thus described my invention, what I claim, and desire to secure by Letters Patent, is—

1. The combination of the flattened whiffletree, the casing secured on the upper side of the same, the hook pivoted in the outer end of the casing having a notch, E, in its edge and provided with a flattened end, H, and a lip, I, both adapted to rest on the flat upper side of the whiffletree, and the spring secured in the casing and having its end engaging the notch in the edge of the hook, as set forth.

2. The combination of the casing, the hook pivoted therein and having the lip I and tongue J, and the spring secured in the casing and bearing on the hook, as specified.

In testimony that I claim the foregoing as my own I have hereto affixed my signature in presence of two witnesses.

ADAM H. EYSAMAN.

Witnesses:
L. C. SMITH,
B. B. SMITH.